United States Patent [19]

Hawes et al.

[11] Patent Number: 4,706,980

[45] Date of Patent: Nov. 17, 1987

[54] VEHICLE QUARTER FENDER AND ASSEMBLY FOR MOUNTING THE SAME

[75] Inventors: Timothy R. Hawes, Muskegon; Steven A. Antekeier, North Shores; Glenn R. Cryderman; David I. Munger, both of Muskegon; Leonard A. Gould, Fruitport; Louis E. Eklund, Jr., Muskegon, all of Mich.

[73] Assignee: Fleet Engineers Inc., Muskegon, Mich.

[21] Appl. No.: 841,280

[22] Filed: Mar. 19, 1986

[51] Int. Cl.⁴ .................................................. B62B 9/16
[52] U.S. Cl. .............................. 280/154; 280/154.5 R
[58] Field of Search ............ 280/154.5 R, 154, 152 R, 280/153 R; 403/262, 386, 237, 188, 234, 196, 192

[56] References Cited

U.S. PATENT DOCUMENTS

| Re. 24,339 | 7/1957 | La Pere | 280/152 R |
|---|---|---|---|
| 794,472 | 7/1905 | Thompson | 280/154 |
| 2,557,147 | 6/1951 | Schatzman | 280/153 R |
| 2,914,341 | 11/1959 | Martt | 280/152 R |
| 2,972,149 | 2/1961 | Bracesco | 280/152 R |
| 3,337,238 | 8/1967 | Weasel, Jr. | 280/154.5 R |
| 3,497,237 | 2/1970 | Vis | 280/152 R |
| 3,506,282 | 4/1970 | Miyanaga | 280/152 R |
| 3,922,003 | 11/1975 | Lea | 280/154.5 R |
| 4,148,373 | 4/1979 | Cline | 280/154.5 R |
| 4,268,053 | 5/1981 | Toppins et al. | 280/154.5 R |
| 4,377,294 | 3/1983 | Lockwood et al. | 280/154.5 R |
| 4,406,474 | 9/1983 | Scharf | 280/154.5 R |
| 4,591,179 | 5/1986 | Mortvedt et al. | 280/154.5 R |

OTHER PUBLICATIONS

Advertising literature of Life-Time Fenders.
Advertising literature of Fleetline Products, Inc.
Advertising literature of John Heinrich Company.

Primary Examiner—John J. Love
Assistant Examiner—Karin L. Ferriter
Attorney, Agent, or Firm—Varnum, Riddering, Schmidt & Howlett

[57] ABSTRACT

A quarter fender 12 is mounted to a vehicle frame 14 by a mounting assembly 10. The fender 12 includes a pair of downwardly depending flanges 22 extending along longitudinal sides 20 thereof. A mounting rod 16 is secured to and positioned transversely of the longitudinal axis of the frame 14. The mounting assembly 10 comprises an L-shaped saddle 42 securely engaging an inside top portion 76 and the inside flange 22 of the fender 12; an L-shaped bracket 44 securely engaging substantially the full width of a bottom portion 78 and the inside flange 22 of the fender 12; a seat 50 secured to the saddle 42 and positioned along a transverse axis of the fender 12; and a mounting tube 46 secured within the seat and an inner end 75 of which slidably and securely engages the mounting rod 16.

20 Claims, 6 Drawing Figures

VEHICLE QUARTER FENDER AND ASSEMBLY FOR MOUNTING THE SAME

FIELD OF THE INVENTION

This invention relates to a quarter fender for a truck or other similar vehicle. More particularly, the invention relates to a quarter fender assembly for mounting to a truck frame wherein the mounting assembly rigidly mounts the fender with a minimum of mounting tube and brackets on top of the fender.

BACKGROUND OF THE INVENTION

Most passenger automobiles are equipped with spray shields in the form of what are called "fenders" for preventing surface materials, such as mud, pebbles, water and the like from being thrown upwardly, laterally and backwardly by rotating wheels of the vehicle. Most truck-type vehicles, however, such as dual and tandem wheel tractors, are not always so equipped. Since these vehicles are not always provided by the manufacturers with fender structures, road material thrown off by the rotating wheels of the same results in a visually impenetrable spray into the area alongside of the truck, such spray making it dangerous and almost impossible for a following driver to see around and in front of the truck and to thus pass the same. In addition, the rotating wheels throw off road material onto the truck itself, thereby dirtying the vehicle and possibly causing damage to the same. In order to eliminate these driving hazards and to meet basic safety requirements, which may be statutorily imposed, it is necessary for operators to independently provide protective fenders for their vehicles.

To satisfy the above-identified demand for "after-market" quarter fenders, numerous companies have manufactured such fenders and assemblies for mounting the same to the vehicle chassis. For example, quarter fenders and assemblies for mounting the same that have been available are illustrated in the U.S. Pat. Nos. 4,148,373 to Cline and Lockwood, et al 4,377,294, issued Apr. 10, 1979 and Mar. 22, 1983, respectively. The fenders disclosed by these references, as well as other similar types available, generally comprise an arcurately curved panel which may be formed with longitudinally extending side flanges. In addition, a seat may be formed integral with or rigidly secured to a top side of the panel and positioned along a central transverse axis of the same. The assembly for mounting the fender includes a mounting rod rigidly secured to and positioned perpendicular to the longitudinal axis of the vehicle frame; and a mounting tube rigidly secured to and seated within the panel seat, slidably engaging the mounting rod and having a longitudinally extending slot. At least one clamp circumscribing the tube, in the region of the slot, compresses the tube in tight engagement with the rod to securely mount the fender to the frame. In order to provide the necessary stability and rigidity to the fender under normal operating conditions of the vehicle, it has been necessary to position the seat, and the mounting tube rigidly secured therein, transversely across a majority of the full width of the fender.

Since the market for after-market quarter fenders has become very competitive, the aesthetic appearance, as well as the quality of construction, of the fenders, and the mounting assemblies relating thereto, has become very important. Thus, it is desirable to construct a quarter fender and mounting assembly(1) with the seat and mounting tube extending transversely over a relatively small portion of the width of the fender and (2) having elements which give optimal stability along longitudinal, transverse and diagonal axes of the fender, but which are hidden from view when mounted to the vehicle.

SUMMARY OF THE INVENTION

The combination of a fender and an assembly for mounting the fender to a vehicle frame, wherein the fender comprises top and bottom surfaces, a front portion, a width and a downwardly depending flange extending along an inside longitudinal edge of the fender. The mounting assembly comprises a rod secured to and positioned substantially transversely of a longitudinal axis of the frame; a mounting means extending transversely over less than one-half of the width of the top surface of the fender and adapted to engage the rod to mount the fender to the frame; and a rigidifying means extending transversely over more than one-half of the full width of the bottom surface of the fender, secured to the mounting means and for providing rigidity to the fender when mounted to the frame.

The mounting means comprises a saddle bracket having a first leg engaging the top surface of the fender; a second leg engaging the flange; a seat rigidly secured to or formed integral with the first leg; and a tube secured within the seat and adapted to slidably engage the rod to mount the fender to the frame. The tube includes a longitudinally extending slot; and the assembly further comprises at least one clamp adapted to slidably engage the tube and compress the tube, in the region of the slot, into tight engagement with the rod to securely mount the tube to the rod. Alternatively, the tube has a longitudinally extending slot and a pair of longitudinally extending mounting flanges secured to or formed integral with the tube, on opposite sides of the slot, and having at least one pair of aligned orifices. At least one first pin is adapted to extend through the pair of aligned orifices and draw the flanges together to compress the tube, and the region of the slot, into tight engagement with the rod to securely mount the tube to the rod.

The rigidifying means comprises a rigid plate having a first portion engaging the bottom surface of the fender; a second portion engaging the flange; and a plurality of stiffening ribs formed integral with and extending along longitudinal, transverse and diagonal axes of the plate and for adding rigidity to the plate.

The second leg of the saddle bracket includes at least one first hole and the second portion of the plate comprises at least one first opening aligned with the first hole. At least one second pin extends through the aligned first opening and first hole to secure the saddle bracket to the plate. In addition, the fender includes at least one first aperture and the first portion of the plate includes at least one second opening aligned with the first aperture. At least one third pin extends through the aligned first aperture and the second opening to secure the plate to the fender. Further, the seat comprises at least one bore, the first leg of the saddle bracket comprises at least one second hole aligned with the bore, with the aligned bore and second hole aligned with the aligned first aperture and second opening, and the third pin extends through the aligned bore, second hole, first aperture and second opening to secure the fender in sandwiched relationship between the saddle bracket and the plate.

The Assembly further includes a deflector securely mounted to the front portion of the fender. In addition, the fender has at least one rib extending along a substantially transverse axis of the fender and for providing rigidity to the fender.

BRIEF DESCRIPTION OF THE DRAWINGS

The invention will now be described with reference to the drawings in which.

DESCRIPTION OF THE PREFERRED EMBODIMENTS

Figure 1:
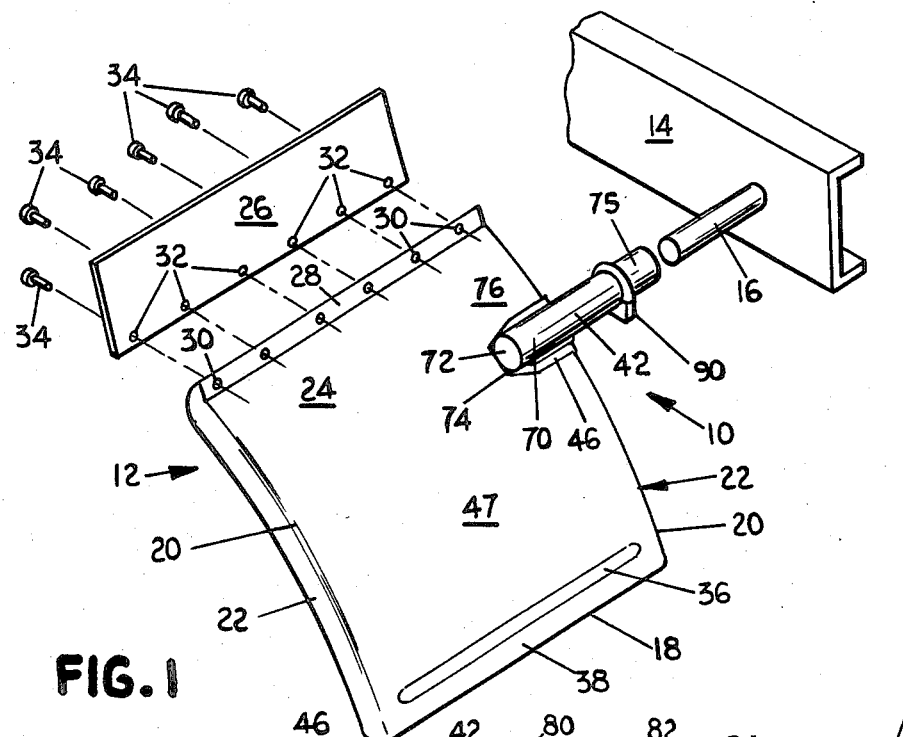
FIG. 1 is a partially exploded perspective view of a quarter fender mounted to a truck frame by a mounting assembly in accordance with the invention.

Referring to the drawings in detail, there is shown an assembly 10 for securely mounting a quarter fender 12 to a frame 14 of a truck (not shown) or other similar vehicle. The frame 14 is shown as a substantially C-shaped member, in cross-section, and constitutes that part of the truck chassis positioned at a point slightly inward of a set of wheels (not shown) mounted to the truck.

The fender 12 is mounted to the truck frame 14 by a mounting rod 16 rigidly secured to and positioned transversely of the longitudinal axis of the frame. The mounting rod 16 is of the type conventionally utilized and disclosed in prior art patents. For example, as shown in U.S. Pat. No. 4,377,294 to Lockwood et al, issued Mar. 22, 1983, the mounting rod is shown as a cylindrical tube having welded within the inner end thereof a nut forming a threaded socket in the tube. The mounting rod is secured to the frame by a bolt extending through a hole in the frame and set into tight threaded engagement with the nut. Alternatively, it is contemplated that the mounting rod 16 may be of the type disclosed in the U.S. Pat. No. 3,922,003 to Lea, issued Nov. 25, 1975. Lea shows the mounting rod as an elongated solid bar matingly engaging and rigidly secured to a top horizontal portion of the frame by a plurality of U-bolts.

Figure 2:
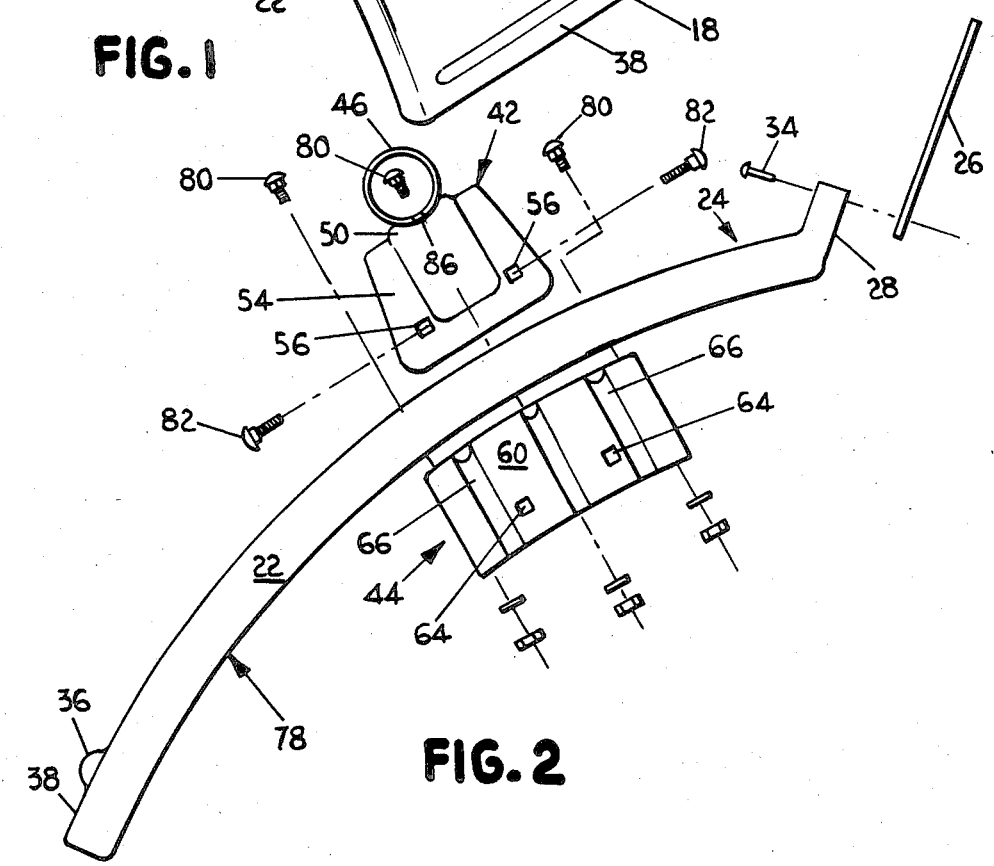
FIG. 2 is an exploded side elevational view of the quarter fender and mounting assembly shown in FIG. 1.
Figure 3:
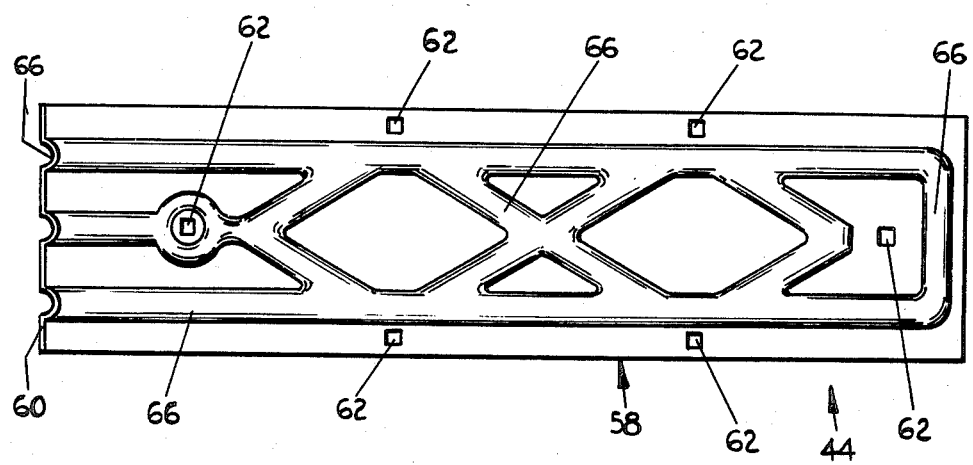
FIG. 3 is a bottom view of a mounting bracket of the mounting assembly shown in FIGS. 1 through 3.

As best illustrated in FIGS. 1 and 2, the quarter fender 12 comprises a relatively rigid sheet metal panel 18 having a generally arcuate shape along the longitudinal axis thereof and a width sufficient to span transversely across the wheel set (not shown). In addition, the panel 18 has the longitudinal sides 20 thereof bent downwardly so as to form a pair of first flanges 22 on the panel. The first flanges 22 function to aid the fender 12 in its ability to deflect material, such as water, spray and rocks, thrown upwardly by the wheels (not shown) when in operation. In addition, the panel 18 is adapted to mount, on a front transverse side 24 thereof, an additional deflector 26. To this end, the fender 12 includes a substantially planar mounting flange 28 formed integral with the front transverse side 24 of the panel 18 and a plurality of first holes 30 extending through the mounting flange. The deflector 26 includes a corresponding number of orifices 32 aligned with the first holes 30. An equal number of first bolts 34 extend through the aligned first holes 30 and orifices 32 to securely mount the deflector 26 to the panel 18. The panel 18 further includes a first stiffening rib 36 formed integral with and extending along a transverse axis on the rear side 38 of the panel. In addition to lending rigidity to the panel 12 along longitudinal axes thereof, the first rib 36 adds to the aesthetic attractiveness of the fender 12. Finally, the fender has, extending along central transverse axes thereof, a number of second holes 40.

Although the panel 18 is preferably made of metals, such as cold rolled steel, galvanized steel, stainless steel, or aluminum, it is contemplated that the panel can be made of a molded plastic, such as high density polyethylene. In addition, the deflector 26 is preferably made of molded polyethelene, rubber, vinyl or any other flexible synthetic material.

The mounting assembly 10 comprises a saddle 42, a mounting bracket 44 and a mounting tube 46. The saddle 42 is a substantially L-shaped member comprising a relatively short, with respect to the width of main body portion 47 of the fender 12, first leg 48 including a seat 50 extending along substantially the full length of the first leg and including an indentation 51 having a predetermined radius of curvature. The first leg 48 also includes at least one first aperture 52 extending through the same and the seat 50 rigidly secured to the first leg. A second leg 54 of the saddle 42 includes a plurality of second apertures 56 extending therethrough.

The mounting bracket 44, like the saddle 42, is a substantially L-shaped member comprising first and second portions (58, 60), with the first portion having a series of first openings 62 extending through longitudinal axes thereof and the second portion 60 having a plurality of second openings 64 extending therethrough. In contrast to the first leg 48 of the saddle 42, the first portion 58 of the bracket 44 has a length substantially equal to the full width of the main body portion 47 of the fender 12. In addition, the mounting bracket 44 includes a number of second stiffening ribs 66 formed integral with and extending along longitudinal, transverse and diagonal axes of the bracket and the function of which will be hereinafter explained in detail.

The mounting tube 46 is a relatively short tubular member having a radius of curvature corresponding to the radius of curvature of the indentation 51 of the seat 50. The mounting tube 46 includes a second orifice 68 extending through an outer end 70 of the mounting tube.

The mounting tube 46 is rigidly secured to, as by welding, and engages the seat 50 of the saddle 42 such that the second orifice 68 of the tube is aligned with the first aperture 52 extending through the first leg 48 of the saddle and the seat. In addition, when mounted to the seat, an outside terminal edge 72 of the mounting tube 46 is positioned substantially flush with respect to the outside terminal end 74 of the seat 50; and an inner end 75 of the tube is free from engagement with and is disposed inwardly with respect to the fender 12. The saddle 42 engages an inside top portion 76 and the inside first flange 22 of the fender 12 such that the aligned first aperture 52 of the saddle 42 and second orifice 68 of the mounting tube 46 are in registry with a second hole 40 of the fender 12; and that portion of the second leg 54 of the saddle 42 through which extend the second apertures 56 is positioned downwardly with respect to and does not engage the inside first flange 22 of the fender. The mounting bracket 44 is also mounted to the fender 12 such that the first portion 58 of the bracket 44 engages a bottom portion 78 of the fender 12 and extends across the full width of the same; and the second portion 60 of the bracket engages the inside first flange 22 of the fender 12. Further, the first openings 62 of the bracket 44 are aligned with the second holes 40 of the fender 12, with one of the first openings also positioned in registry with the aligned first aperture 52 and second orifice 68. In addition, that part of the second portion 60 of the bracket 44 through which the second openings 64 extend is positioned downwardly with respect to the inside first flange 22 of the fender 12 such that the second openings 64 are aligned with the second apertures 56 of the saddle 42.

A plurality of second bolts 80 extend through the aligned second holes 40 of the fender 12 and the first openings 62 of the bracket 44, with one of the second bolts also extending through the aligned first aperture 52, extending through the saddle 42 and the seat 50, and the second orifice 68 of the mounting tube 46. In addition, a pair of third bolts 82 extend through the aligned second apertures 56 of the saddle 42 and second openings 64 of the mounting bracket 44. In this manner, the saddle 42 and the mounting bracket 44 are securely mounted together, with the fender 12 securely sandwiched there between.

Figure 4:
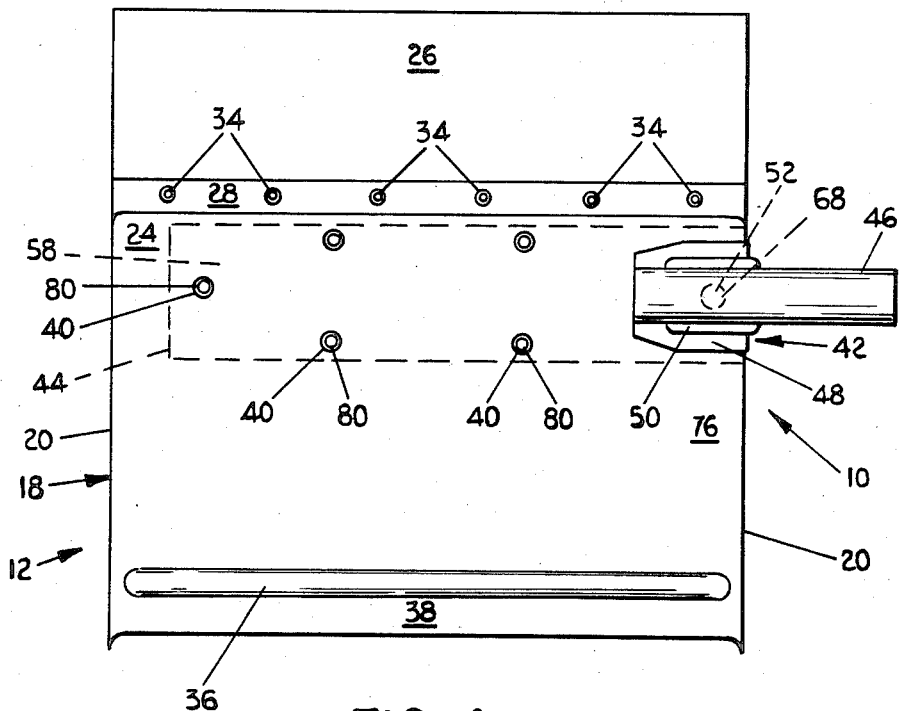
FIG. 4 is a plan view of the quarter fender and mounting assembly shown in FIGS. 1 and 2.
Figure 5:
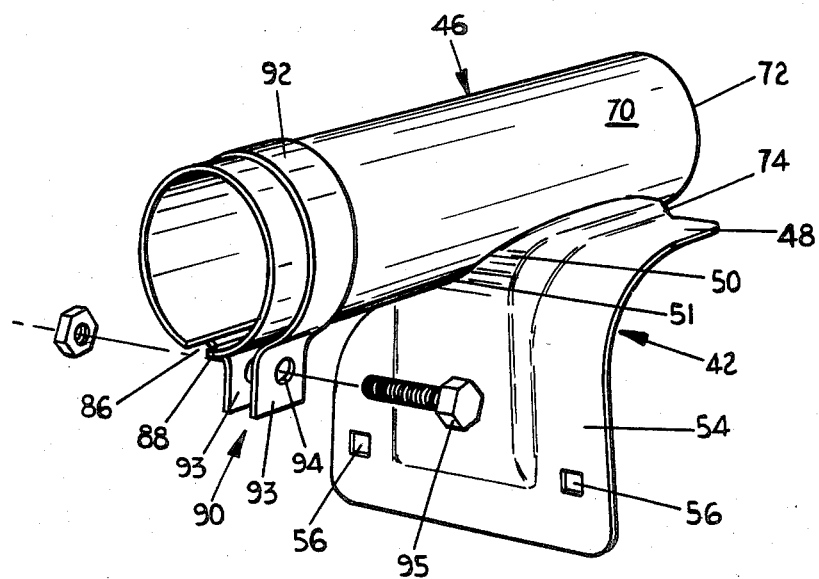
FIG. 5 is a perspective view of a saddle and a mounting tube of the mounting assembly shown in FIGS. 1 through 3.

The fender 12 is mounted to the truck (not shown) by the mounting tube 46 of the assembly 10. Specifically, the mounting tube 46 is adapted to slidably and rotatably engage and securely clamp to the mounting rod 16 rigidly secured to the frame 14 of the vehicle. To this end, as shown in FIG. 4, the mounting tube 46 includes, on an inner end 84 thereof, a longitudinally-extending slot 86. The slot 86 is of a length to extend from the terminal inner edge 88 of the tube 46 to a point approximately intermediate the same. The slot 86 enables the support tube 46, when mounted to the rod 16, to be compressed or collapsed, in the region of the slot, into a secure clamped engagement around the mounting rod. This collapsing is obtained by the use of at least one compression clamp 90 slidably mounted to and circumscribing the mounting tube 46 in the region of the slot 86. The clamp 90 comprises an arcuate portion 92 having a curved surface coinciding with and matingly engaging the curved surface of the mounting tube 46 and a pair of arms 93 formed integral with or rigidly secured to the arcuate portion 92. The arms 93 have a pair of aligned bores 94 extending therethrough. A fourth bolt 95 extends through the aligned bores 94. Subsequent to slidably engaging the tube 46 with the rod 16, the bolt 95 is tightened which results in compression of the mounting tube 46 and the secure mounting of the tube to the rod. The telescopic relationship between the tube 46 and the rod 16 enables the fender 12, carried by the tube, to be adjusted angularly as well as axially as is desired or as may be necessary to properly position the fender relative to the wheel set (not shown).

Figure 6:
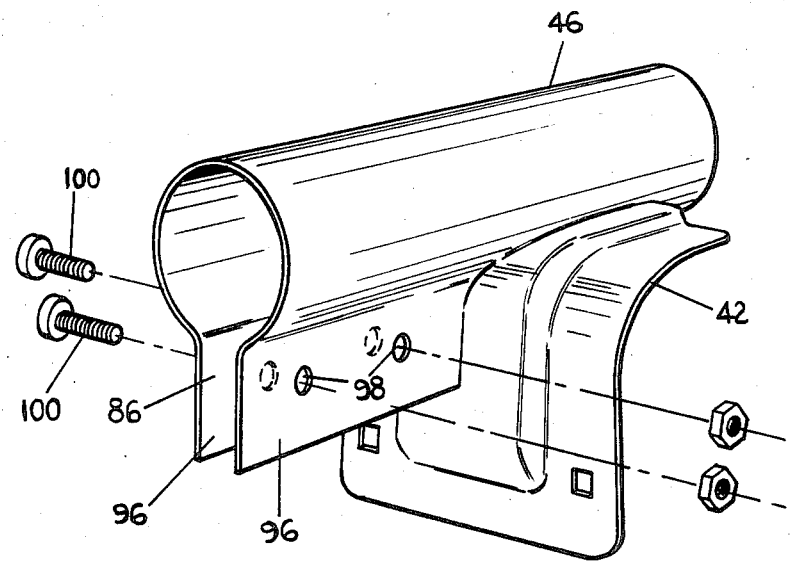
FIG. 6 is a perspective view of an alternative embodiment of the mounting tube.

In an alternative embodiment of the invention, as shown in FIG. 6, the mounting tube 46 further comprises a pair of elongated mounting flanges 96 extending radially outwardly with respect to and rigidly secured to or formed integral with the inner end 88 of the mounting tube and positioned adjacent opposite sides of the slot 86 of the same. The flanges 96 include pairs of aligned third orifices 98. A pair of threaded fourth bolts 100 extend through the pairs of aligned orifices 96.

Subsequent to slidably engaging the mounting tube 46 with the mounting rod 16, the fourth bolts 100 are tightened to pinch together the flanges and compress the mounting tube to thereby securely clamp the tube to the rod.

As stated above, the first leg 48 of the saddle 42 is relatively short with respect to the main body portion 47 of the fender 12. Indeed, when mounted to the fender 12, as previously described, the first leg 48 of the saddle 42 extends transversely over less than one-half of the full width of the main body portion 47 of the fender. Accordingly, the mounting tube 46 seated on the first leg 48 is also positioned over less than one-half of the width of the fender 12. By this construction, the fender 12 is supported from the vehicle frame 12 by an assembly 10, the visible elements of which, the support tube 46 and the saddle 42, extend transversely over a relatively small inside top portion 34 of the fender 12. Since the support tube 46 and the saddle 42 do not extend across substantially the entire width of the fender 12, the assembly 10 is relatively aerodynamic and contributes to the aesthetic attractiveness of the truck (not shown) to which it is mounted.

Stability along longitudinal and transverse axes of the fender is achieved primarily by the mounting bracket 44 which is hidden from view when the assembly 10 is mounted to the frame 12. As stated above, when mounted to the fender 12, the first portion 58 of the bracket 44 extends substantially along the full width of the fender. When the bracket 44, however, engages the bottom portion 78 of the fender 12, it is hidden from view. To aid in rigidifying the fender 12 and the assembly 10 mounting the same, the bracket 44, as mentioned previously, has formed thereon a plurality of second stiffening ribs 66. Specifically, the stiffening ribs 66 extend longitudinally and transversely over substantially the full length and width, respectively, of the bracket 44. In addition, the second ribs 66 extend along diagonally axes of the bracket to form a criss-cross pattern on the same. In this manner, the second ribs 66 give optimal stability and rigidity to the assembly 10 and the fender 12 mounted thereto under all normal operating conditions of the vehicle (not shown).

While the invention will be described in connection with a preferred embodiment, it will be understood that we do not intend to limit the invention to that embodiment. To the contrary, we intend to cover all alternatives, modifications and equivalents as may be included within the spirit and scope of the invention as defined by the appended claims.

The embodiments of the invention in which an exclusive property or privilege is claimed are defined as follows:

1. The combination of a fender and an assembly for mounting said fender to a vehicle frame, said fender having top and bottom surfaces, a width and a flange on an inside longitudinal edge of said fender and said assembly comprising a rod secured to and positioned substantially transversely of a longitudinal axis of said frame, wherein said assembly further comprises:
   a mounting means extending transversely over less than one-half of said width of said top surfce of said fender, engaging said flange and adapted to engage said rod to mount said fender to said frame; and
   a rigidifying means extending transversely over more than one-half of said full width of said bottom surface of said fender, engaging said flange, secured to said mounting means and for providing rigidity to said fender when mounted to said frame.

2. A combination according to claim 1, wherein said mounting means comprises a saddle bracket having a first leg engaging said top surace of said fender and a tube secured to said saddle bracket and adapted to slidably engage said rod to mount said fender to said frame.

3. A combination according to claim 2, wherein said mounting means further comprises a seat rigidly secured to of formed integral with said first leg and in which is secured said tube.

4. A combination according to claim 1, wherein said rigidifying means conmprises a rigid plate having a first portion engaging said bottom surface of said fender.

5. A combination according to claim 4, wherein said rigid plate comprises a plurality of stiffening ribs formed integral with and extending along longitudinal, transverse and diagonal axes of said plate and for providing rigidity to said plate.

6. A combination according to claim 1, wherein said mounting means comprises a saddle bracket having a first leg engaging said top surface of said fender, a seat rigidly secured to or formed integral with said first leg and a tube secured within said seat and adapted to slidably engage said rod to mount said fender to said frame; and said rigidifying means comprises a rigid plate having a first portion engaging said bottom surface of said fender.

7. A combination according to claim 6, wherein said rigid plate comprises a plurality of stiffening ribs formed integral with and extending along longitudinal, transverse and diagonal axes of said plate and for adding rigidity to said plate.

8. A combination according to claim 7, wherein said saddle bracket comprises a second leg engaging said flange; and said rigid plate comprises a second portion engaging said flange.

9. A combination according to claim 8, wherein said tube comprises a longitudinally-extending slot; and said assembly further comprises at least one clamp adapted to slidably engage said tube and compress said tube, in the region of said slot, into tight engagement with said rod to securely mount said tube to said rod.

10. A combination according to claim 8, wherein said tube comprises a longitudinally-extending slot and a pair of longitudinally-extending mounting flanges secured to or formed integral with said tube, on opposite sides of said slot, and having at least one pair of aligned orifices; and said assembly further comprises at least one first pin adapted to extend through said pair of aligned orifices and draw said flanges together to compress said tube, in the region of said slot, into tight engagement with said rod to securely mount said tube to said rod.

11. A combination according to claim 9, wherein said second leg of said saddle bracket further comprises at least one first hole and said second portion of said plate comprises at least one first opening aligned with said first hole; and said assembly further comprises at least one second pin extending through said aligned first opening and first hole to secure said saddle bracket to said plate.

12. A combination according to claim 11, wherein said fender further comprises at least one first aperture and said first portion of said plate further comprises at least one second opening aligned with said first aperture; and said assembly further comprises at least one third pin extending through said aligned first aperture and said second opening to secure said plate to said fender.

13. A combination according to claim 12, wherein said seat comprises at least one bore, said first leg of said saddle bracket comprises at least one second hole aligned with said bore, with said aligned bore and second hole aligned with said aligned first aperture and second opening, and said third pin extends through said aligned bore, second hole, first aperture and second opening to secure said fender in sandwiched relationship between said saddle bracket and said plate.

14. A combination according to claim 13, wherein said fender further comprises a front portion; and said assembly further comprises a deflector securely mounted to said front portion.

15. A combination according to claim 14, wherein said fender further comprises at least one rib extending along a substantially transverse axis of said fender and for providing rigidity to said fender.

16. A combination according to claim 10, wherein said second leg of said saddle further comprises at least one first hole and said second portion of said plate comprises at least one first opening aligned with said first hole; and said assembly further comprises at least one second pin extending through said aligned first opening and first hole to secure said saddle to said plate.

17. A combination according to claim 16, wherein said fender further comprises at least one first aperture and said first portion further comprises at least one second opening aligned with said first aperture; and said assembly further comprises at least one third pin extending through said aligned first aperture and second opening to secure said plate to said fender.

18. A combination according to claim 17, wherein said seat comprises at least one bore, said first leg of said saddle bracket comprises at least one second hole aligned with said bore, with said aligned bore and second hole aligned with said aligned first aperture and second opening, and said third pin extends through said aligned bore, second hold, first aperture and second opening to secure said fender in sandwiched relationship between said saddle bracket and said plate.

19. A combination according to claim 18, wherein said fender further comprises a front portion; and said assembly further comprises a deflector securely mounted to said front portion.

20. A combination according to claim 19, wherein said fender further comprises at least one rib extending along a substantially transverse axis of said fender and for providing rigidity to said fender.

* * * * *